OSCILLATOR USING A SEMI-CONDUCTOR CONTROLLED RECTIFIER CAPABLE OF BEING SWITCHED ON AND OFF AT ITS GATE

Filed Sept. 10, 1962

United States Patent Office 3,206,696

Patented Sept. 14, 1965

3,206,696

OSCILLATOR USING A SEMI-CONDUCTOR CONTROLLED RECTIFIER CAPABLE OF BEING SWITCHED ON AND OFF AT ITS GATE

Maurice James Wright, Harborne, Birmingham, England, assignor to Joseph Lucas (Industries) Limited, Birmingham, England Filed Sept. 10, 1962, Ser. No. 222,382
Claims priority, application Great Britain, Sept. 18, 1961, 33,326/61
5 Claims. (Cl. 331—107)

The object of this invention is to provide an oscillator in a convenient form.

The present invention makes use of a device known as a controlled rectifier, the characteristic of which is that if a triggering pulse is applied between its gate and cathode terminals the rectifier becomes conductive, and thereafter continues to conduct, even when the triggering pulse is removed, until the anode-cathode current falls practically to zero. Furthermore, it has recently been discovered that controlled rectifiers manufactured in a certain manner have the additional property that they can be switched off by a pulse of opposite polarity (but not necessarily of equal magnitude) applied between the gate and cathode. Throughout this specification the term "switchable rectifier" is used to mean a controlled rectifier having this additional property.

An oscillator in accordance with the invention comprises in combination a switchable rectifier having its anode and cathode adapted for connection to a voltage source and its gate adapted for connection to a voltage of magnitude intermediate the voltages applied to the anode and cathode respectively, a load in the anode-cathode circuit of the switchable rectifier, and a capacitor or inductor in the cathode-gate circuit of the switchable rectifier, the arrangement being such that in use the switchable rectifier will be successively switched on and off and the voltage across the load will be of substantially square-wave form.

In the accompanying drawings, FIGURES 1 to 5 respectively are circuit diagrams illustrating five examples of the invention.

Figure 1:
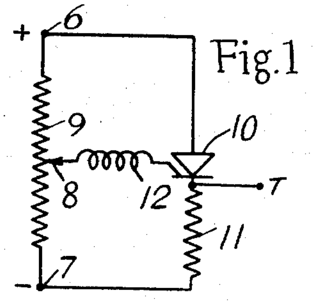

Referring first to FIGURE 1, there is provided a first terminal 6 adapted for connection to a D.C. voltage source so as to be of positive polarity, a second terminal 7 which is earthed, and a third terminal 8 constituted by a point intermediate the ends of a resistor 9 connecting the terminals 6, 7, so as to be at a voltage of magnitude intermediate the voltages applied to the terminals 6, 7.

The terminal 6 is connected to the anode of a switchable rectifier 10 the cathode of which is connected to the terminal 7 through a load, and the gate of which is connected through an inductor 12 to the terminal 8. An output is taken from terminal T connected between the resistor 11 and the cathode of rectifier 10.

In operation, initially there is no current flow in the anode-cathode circuit. However, current flows from terminal 6 through the upper part of resistor 9, the inductor 12, the gate and cathode of the rectifier 10 and the resistor 11 to the terminal 7. This current builds up exponentially until a predetermined value is reached at which the switchable rectifier 10 is switched on. The cathode of the rectifier 10 is now at substantially the positive potential and current flows from the cathode through the gate, the inductor 12 and the lower part of resistor 9 to terminal 7. This current will, because of the inductor 12, decrease exponentially until a predetermined negative current is reached at which the switchable rectifier is switched off. This cycle is repeated until the power source is removed, and it will be understood that the voltage across the load 11 will be of substantially square-wave form.

Figure 2:
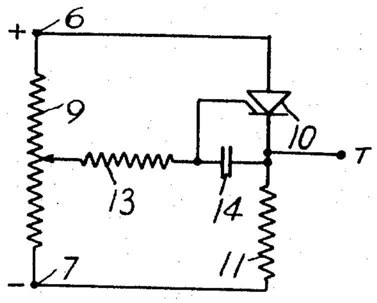

In the example shown in FIGURE 2 the inductor is replaced by a resistor 13, and a capacitor 14 is connected across the gate and cathode of the switchable rectifier 10. In operation, initially there is no current flow in the anode-cathode circuit. However, current flows from the terminal 6 through the upper part of resistor 9, the resistor 13, the capacitor 14 and the resistor 11, so that the capacitor 14 is charged. The voltage between the gate and cathode of the rectifier 10 is the same as the voltage across the capacitor 14, and so as the capacitor 14 charges, the gate-cathode voltage increases with consequential increase of the gate-cathode current. Thus, the gate-cathode current builds up as in FIGURE 1 until a value is reached at which the rectifier 10 is switched on, and current flows through the anode and cathode of the rectifier 10 and the load 11. The cathode of the rectifier 10 now assumes substantially the potential of the terminal 6, and charging current for the capacitor 14 now flows from the terminal 6 through the anode and cathode of the rectifier 10, the capacitor 14, the resistor 13 and the lower part of the resistor 9. The gate-cathode voltage of the rectifier 10 builds up in the opposite sense and is again governed by the voltage across the capacitor 14, and when the gate-cathode current reaches a predetermined value the rectifier 10 will be switched off. The cycle is repeated until the power source is removed.

Figures 3, 4:
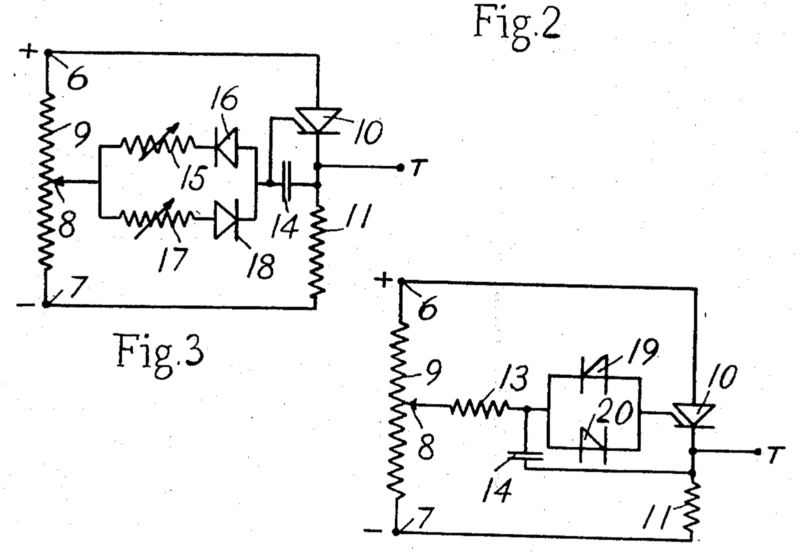

In the modification of FIGURE 2 seen in FIGURE 3 the resistor 13 is replaced by two parallel circuits containing respectively a variable resistor 15 and a diode 16 in series, and a variable resistor 17 and a diode 18 in series. The diodes 16, 18 are connected to conduct negative current to and from the gate respectively. The actual operation of the circuit shown in FIGURE 3 so far as the load 11 is concerned is identical with FIGURE 2. However, in the case of FIGURE 3, the current which flows to charge the capacitor 14 while the rectifier 10 is switched off flows through the upper part of the resistor 9, the variable resistor 17, the diode 18, the capacitor 14 and the resistor 11. When the rectifier 10 is switched on and the capacitor 14 is charged in the reverse sense, the charging current flows from the terminal 6 through the anode and cathode of the rectifier 10, the capacitor 14, the diode 16, the variable resistor 15 and the lower part of the resistor 9. It will be appreciated that whereas in FIGURE 2 the time taken to charge the capacitor to the positive and negative voltages required for switching the rectifier 10 on and off are both determined by the resistor 13, in FIGURE 3 the independently variable resistors 15, 17 can be pre-set to vary the times taken to charge the capacitor 14 in the positive and negative senses.

It will be appreciated that the rectifier 10 shown in FIGURES 2 and 3 can conduct gate-cathode current all the time the capacitor 14 is charging, although this gate-cathode current will not be sufficient to switch the rectifier 10 on or off until the predetermined values are reached as explained. Nevertheless, while the capacitor 14 is charging but before the rectifier 10 is switched, the capacitor 14 is shunted by the gate-cathode path, so that there is a wastage of current. In FIGURE 4, a modification of FIGURE 2 is illustrated in which instead of connecting a point intermediate the resistor 13 and capacitor 14 directly to the gate of the rectifier 10, this point is connected to the gate of the rectifier 10 through four-layer diodes 19, 20 which are connected in opposite senses. The four-layer diodes, as is well known in the art, are devices which when reverse biased behave like reverse-biased diodes and do not conduct. However, when a four-layer diode is forward biased, it does not conduct until the voltage across it reaches a predetermined value, at which point the diode does conduct, and then continues to conduct until the current through it falls to zero. In operation, when the rectifier 10 is switched off in FIGURE 4, the capacitor 14 starts to charge through the upper part of resistor 9 and the resistors 13, 11 as in FIGURE 2, but the capacitor charging current is not shunted by the gate-cathode path of the rectifier 10 because the diode 19 is reverse biased, and the diode 20, although it is forward biased, is not yet conducting. When the voltage across the capacitor 14 reaches the breakdown voltage of the diode 20, the diode 20 conducts, and the capacitor 14 discharges through the diode 20 and the gate and cathode of the rectifier 10 to switch the rectifier 10 on. The voltage at the cathode of the rectifier 10 now rises to the positive potential, and the capacitor 14 is charged in the opposite direction through the anode and cathode of the rectifier 10, the resistor 13 and the lower part of the resistor 9. In this case, the diode 20 is reverse biased and the diode 19 is forward biased, and when the voltage across the capacitor 14 reaches a predetermined value, the diode 19 breaks down and the capacitor 14 discharges through the diode 19 and the gate and cathode of the rectifier 10 to switch the rectifier 10 off. It will be appreciated that with this arrangement a pulse of energy derived by discharge of the capacitor 14 is applied to the gate and cathode of the rectifier 10 very quickly, so that the rectifier 10 is switched very rapidly.

Figure 5:
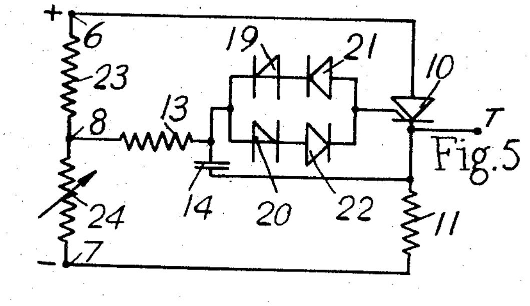

The arrangement shown in FIGURE 5 differs from the arrangement shown in FIGURE 4 in that diodes 21, 22 are included in series with the diodes 19, 20 respectively. The diodes 21, 22 do not alter the operation of the circuit in any way, but are included merely to protect the diodes 19, 20. As previously explained, the diodes 19, 20 behave when they are reverse biased in a similar manner to ordinary diodes, but if the reverse voltage across them exceeds a predetermined value, the diodes 19, 20 may be damaged. The addition of the diodes 21, 22 ensures that any reverse voltage applied, for example, across the diode 20 is shared between the diode 20 and the diode 22, so that the diode 22 in effect is protecting the diode 20. Similarly, the diode 21 is protecting the diode 19.

The resistor 9 could be replaced by a fixed resistor 23 and a variable resistor 24 as shown in FIGURE 5. The resistor 24 may be constituted by, for example, a thermistor, a photocell or a transistor, or by a variable D.C. source such as a tachometer. The condition of these devices then controls current flow in the load 11.

Having thus described my invention what I claim as new and desire to secure by Letters Patent is:

1. An oscillator comprising in combination a D.C. source providing a positive terminal and a negative terminal, potentiometer means connected to said source and providing a point of potential intermediate said positive and said negative potential, a switchable rectifier having an anode, a cathode, and a gate, said switchable rectifier being switched on by a positive voltage applied between its gate and cathode, and being switched off by a negative voltage applied between its gate and cathode, the anode of said switchable rectifier being connected to said positive terminal, a load through which the cathode of said switchable rectifier is connected to said negative terminal, and an inductor through which said gate is connected to said point, positive current flowing through said inductor to said gate to switch on the switchable rectifier when the current has built up to a predetermined level, and the cathode of said switchable rectifier rising to said positive potential when the switchable rectifier is on, negative current then flowing through said inductor until the current builds up to a level at which said switchable rectifier is switched off.

2. An oscillator comprising in combination a D.C. source providing a positive terminal and a negative terminal, potentiometer means interconnecting said terminals and providing a point at a potential intermediate the potentials of said positive and said negative terminals, a switchable rectifier having an anode, a cathode, and a gate, said switchable rectifier being switched on by a positive voltage applied between its gate and cathode and being switched off by a negative voltage applied between its gate and cathode, the anode of said switchable rectifier being connected to said positive terminal, a load through which the cathode of said switchable rectifier is connected to said negative terminal, a capacitor interconnecting the gate and cathode of said switchable rectifier, and a resistor connecting the gate of said switchable rectifier to said point, said capacitor charging through said resistor up until the voltage across said capacitor reaches a value at which it switches on said switchable rectifier, and the cathode of said switchable rectifier then rising to said positive potential, the capacitor then charging in the opposite sense until the voltage across said capacitor reaches a value at which said switchable rectifier is switched off.

3. An oscillator as claimed in claim 2 in which said resistor is variable, said oscillator including a diode in series with said resistor, said diode having its anode connected to said gate, and a circuit in parallel with said variable resistor and diode, said parallel circuit including a second variable resistor and a second diode with its cathode connected to said gate, said variable resistors determining the times for which said switchable rectifier is on and off.

4. An oscillator comprising in combination a D.C. source providing a positive terminal and a negative terminal, potentiometer means interconnecting said positive and said negative terminal and providing a point at a potential intermediate said positive potential and said negative potential, a switchable rectifier having an anode, a cathode and a gate, said switchable rectifier being switched on by a positive voltage applied between its gate and cathode, and being switched off by a negative voltage applied between its gate and cathode, the anode of said switchable rectifier being connected to said positive terminal, a load through which the cathode of said switchable rectifier is connected to said negative terminal, a first four-layer diode having its anode connected to said gate, a second four-layer diode having its cathode connected to said gate, a resistor connected at one end to said point and connected at its other end to the cathode of the first four-layer diode and the anode of the second four-layer diode, and a capacitor connectig a point intermediate said resistor and four-layer diodes to the cathode of said switchable rectifier, said capacitor charging when said switchable rectifier is non-conducting until said second four-layer diode breaks down and said capacitor discharges through the gate and cathode of said switchable rectifier to switch said switchable rectifier on, the cathode of said switchable rectifier then rising to said positive potential, and said capacitor charging in the reverse sense until said first four-layer diode breaks down, when said capacitor discharges through the gate and cathode of said switchable rectifier to switch said switchable rectifier off.

5. An oscillator as claimed in claim 4, including a pair of diodes connected in series with said first and said second four-layer diodes respectively.

References Cited by the Examiner

UNITED STATES PATENTS

| | | | |
|---|---|---|---|
| 2,654,839 | 10/53 | Spaulding | 331—129 X |
| 2,996,641 | 8/61 | Paynter | 331—108 X |

OTHER REFERENCES

Solid State Products, Inc., Bulletin D420-02, August 1959, pages 4 and 7.

ROY LAKE, *Primary Examiner.*

JOHN KOMINSKI, *Examiner.*